United States Patent [19]
Schneider

[11] 3,980,804
[45] Sept. 14, 1976

[54] HIGH TENSION COAXIAL CABLE WITH END STRUCTURE FOR PREVENTING GLOW DISCHARGES

[76] Inventor: Heribert Schneider, 14/13 Wurthgasse, A-1190 Vienna, Austria

[22] Filed: Mar. 28, 1975

[21] Appl. No.: 562,945

[30] Foreign Application Priority Data
Mar. 29, 1974 Austria .............................. 2599/74

[52] U.S. Cl. ............................ 174/73 R; 174/127; 324/54
[51] Int. Cl.² .......................................... H01T 19/00
[58] Field of Search ............ 174/73 R, 127, 140 R, 174/140 CR, 142; 324/54; 317/9 R, 11 B; 307/92, 93; 323/44 R

[56] References Cited
UNITED STATES PATENTS
1,266,516  5/1918  Momota ..................... 174/73 R UX
1,563,946  12/1925  Atkinson .......................... 174/73 R FOREIGN PATENTS OR APPLICATIONS
14,612  4/1971  Japan ................................. 324/54

*Primary Examiner*—Laramie E. Askin
*Attorney, Agent, or Firm*—Watson, Cole, Grindle & Watson

[57] ABSTRACT

A means for preventing glow discharge on electrodes at high tension, the electrodes being insulated from one another by interposition of a dielectric. An auxiliary electrode is provided vicinal to at least one of the electrodes to prevent the growth of glow discharge thereon, the auxiliary electrode being at a potential opposite to the potential of the other electrode.

8 Claims, 6 Drawing Figures

HIGH TENSION COAXIAL CABLE WITH END STRUCTURE FOR PREVENTING GLOW DISCHARGES

The invention relates to a means for preventing glow discharges on the electrodes of high-tension electric appliances, especially at the ends or connections of high-tension cables.

It is well known that strongly inhomogeneous electric fields which cause glow discharges arise on high-tension electrodes, and more particularly at the edges of cable terminations. This so-called edge effect leads to loss of energy and intense heating of the affected parts, which attack the insulation and may even destroy it completely after a comparatively short time. Furthermore, these glow discharges on the electrodes and cable ends prevent the carrying out of the so-called partial discharge measurements for determining and testing the glow discharge behaviour of high-tension appliances at high tension. As a result, high-tension appliances and high-tension cables, e.g. with a voltage of the order of magnitude of 100 kV, more often than not fail in operation.

The glow discharges can be reduced by using rounded electrodes. For instance, ball electrodes are largely free from glow. The glow discharges are also influenced by the homogeneity of the dielectric surrounding the electrode. Gas bubbles or thin gas layers in liquid and solid dielectrics are conductive to glow discharges. Moderate glow discharges may be allowed only in the case of electrodes immersed in insulating oil, because as the oil is heated at the discharge points, new oil is continuously drawn in, ensuring cooling. The possibility of using ball electrodes and oil cables is, however, limited for technical and economic reasons. Modern synthetic materials, which are increasingly used for insulation in cable construction, can be employed, due to their sensitivity to glow discharges, to a limited extent only, say with operational voltages of 30 kV.

Even if insulating vessels filled with oil are used for cable ends, it is not possible to test the cables in a high-tension laboratory, as glow discharges set in under oil once the field strength has reached the glow-discharge point. Such cable ends can be used up to a maximum voltage of 40 kV. In order to be able to raise the test voltage, attempts have, therefore, been made to reduce the glow discharges at the end of the conductive protection jacket of a coaxial high-tension cable by a widening metal funnel which is very carefully mounted to the protective jacket, to avoid gaps. The production of such a cable end cover is, however, time-consuming, so that it can at best be used in laboratories. In addition, such a device requires a correspondingly large oil vessel.

The object of the invention is to provide a means for preventing glow discharges that can be used both in high tension laboratories and in operation on the electrodes of high-tension electric appliances, and particularly as cable caps. According to the invention this is accomplished in such a way that in the zone of the one electrode that is prone to glow discharge, and its edge part in particular, there is provided on the side facing away from the other electrode at least one auxiliary electrode in spaced relationship and an auxiliary tension is applied to it with a potential opposite to the voltage of the other electrode. By providing one or more auxiliary electrodes in this way, and applying to these an auxiliary voltage, the edge effect of the main electrode is compensated, so that the occurrence of glow discharges is prevented. Thus, cable ends can be produced in a simple way even for very high tensions for both service and laboratory use. Moreover, the useful life of the cables is considerably increased owing to the freedom from glow discharge obtained by the means according to the invention.

The means according to the invention can be developed in various ways and adapted to any special requirements. When periodical a.c. voltages or transient voltages are applied to the main electrode, the auxiliary voltage according to the invention will have the same frequency as the main voltage but of at least approximately opposite phase, so that the electric field generated by the main voltage is sufficiently compensated.

The means according to the invention can be used to advantage in both high-tension laboratories and in high-tension conductors in service networks. For cables with a conductive jacket as a screen a device may advantageously be used wherein the auxiliary electrode concentrically encloses the cable jacket at the end of the cable and thus forms a cable cap. In addition, the auxiliary electrode may be arranged together with the main electrodes in an insulating vessel filled with liquid or gaseous dielectric. According to a further embodiment of the invention, which is simple to manufacture, the auxiliary electrode is formed as a coating of sprayed metal or conductive enamel applied to a solid dielectric.

The auxiliary voltage for the auxiliary electrode can be obtained in various ways. For example, it may be delivered by a power source of its own. It is simpler, however, according to a further feature of the invention to apply the auxiliary electrode to the secondary side of its own transformer, whose primary winding is connected between the two main electrodes and whose secondary winding lies between the auxiliary electrode and one of the main electrodes. This eliminates the special arrangements for ensuring the correct phase of the auxiliary voltage. This arrangement can be further simplified for concentrically arranged electrodes, especially in coaxial cables, by making the auxiliary electrode surround the main electrode concentrically and also carry the windings of the transformer.

Finally, for electrodes carrying current the invention envisages an advantageous alternative way of obtaining the auxiliary voltage, wherein the auxiliary electrode is connected to the secondary winding of a single-core transformer, the jacket and annular core of which surround, together with the secondary winding, the electrode that carries the current.

The invention will now be described by way of example with reference to the accompanying drawings, wherein.

Figure 1:
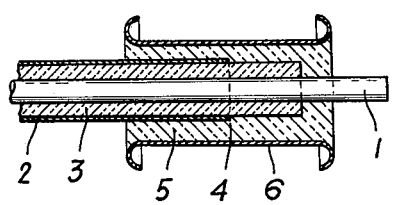
FIG. 1 shows a coaxial cable end structure according to the invention in axial longitudinal section.

The means according to the invention is depicted in FIG. 1 at the end of a coaxial cable. This consists of two high-tension electrodes 1 and 2, which are insulated from each other by a dielectric 3, which must possess an adequate tension resistance and may be solid, liquid or gaseous. An auxiliary electrode 6 is arranged concentrically about the electrode 2 in its edge zone with the interposition of a dielectric 5. In this case too a solid, liquid or gaseous dielectric of sufficient tension resistance can be used.

If there is a potential difference between the electrodes 1 and 2, an inhomogeneous field relative to the electrode 1 will arise in the edge zone 4 of the electrode 2, and even at comparatively small voltage values relative to the break-through voltage of the dielectric 3, this field will produce a glow discharge. To prevent glow discharges there is provided an auxiliary electrode 6, to which is applied an auxiliary voltage of a potential opposite to that of the electrode 2. The amplitude of the auxiliary voltage depends on the strength of the dielectric 5, and thus from the distance between the electrode 2 and the auxiliary electrode 6, as well as the material of the dielectric 5. If the auxiliary voltage is correctly chosen the inhomogeneous field at the edge zone of the electrode 2 will be wholly compensated, so that between the electrodes 1 and 2 tensions can develop up to near the break-through voltage of the dielectric 3 without causing glow discharges. There are largely prevented even if the inhomogeneous field is only partly compensated. If the main tension between the electrodes 1 and 2 is a periodically alternating or a transient one, then the auxiliary voltage applied to the auxiliary electrode 6 must have the same frequency as the main voltage, but need have a phase only approximately opposite to that of this voltage.

Figure 2:
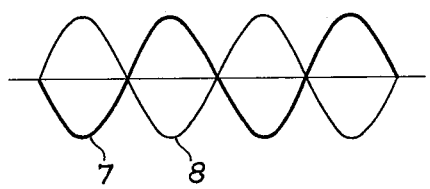
FIG. 2 shows the fluctuation of potential on the electrodes of the coaxial cable end structure shown in FIG. 1.

FIG. 2 exemplifies the potential curve of a periodically alternating voltage 7 as the main voltage and an appropriate auxiliary voltage 8. The amplitude of the auxiliary voltage 8 need not, however, absolutely agree with the amplitude of the main voltage 7. Since it is the object of the auxiliary voltage 8 to compensate the inhomogenous corona field of the electrode 2 in its edge zone 4, a counterfield of an intensity needed completely to compensate the glow-discharge field can be obtained even with a different amplitude of the auxiliary voltage 8 by suitably choosing the spacing of the auxiliary electrode 6 from the electrode 2 and the material of the dielectric 5.

Figure 3:
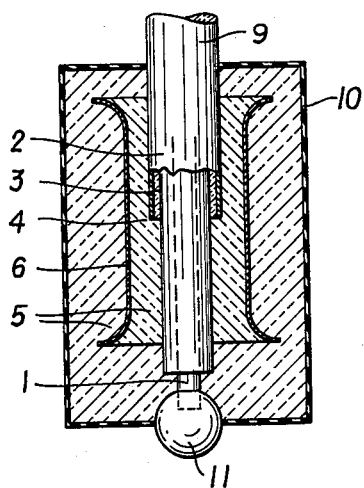
FIG. 3 illustrates diagrammatically a further embodiment of the coaxial cable end structure according to the invention in longitudinal section.

FIG. 3 shows the capping of a high-tension cable 9 with a cable cap formed according to the invention. The core of the coaxial high-tension cable 9 forms one electrode 1 and the metal jacket the second electrode 2. The dielectric 3 between the two electrodes 1 and 2 consists of the synthetic insulation material of the cable. An auxiliary electrode 6 is arranged in the edge zone 4 of the electrode 2 with the interposition of a dielectric 5, and the end of the cable as a whole is enclosed in a vessel 10 of insulating material, in which the auxiliary electrode 6 is completely embedded in the dielectric 5. The cable core serving as the electrode 1 terminates in a ball electrode 11, which projects in part from the vessel 10. If an auxiliary voltage of opposite potential to that of the electrode 1 is applied to the auxiliary electrode 6, this produces a combined field of all the electrodes 1, 2 and 6 that does not allow an inhomogeneous field to arise in the edge zone 4 of the electrode 2. This prevents the occurrence of glow discharges. Any possible air bubbles or gaps in the dielectric 5 have no effect.

Figure 4:
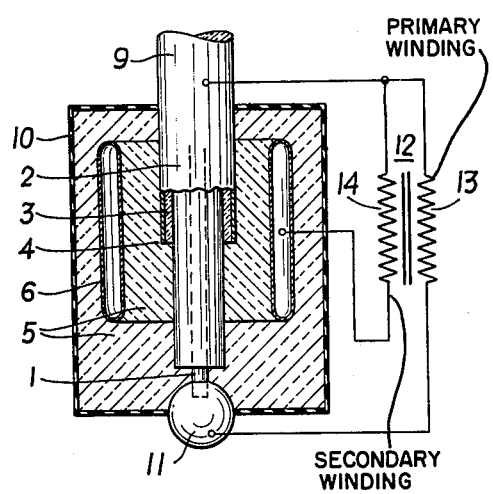
FIGS. 4, 5 and 6 show further embodiments in longitudinal section with arrangements for generating the auxiliary voltage.
Figure 5:
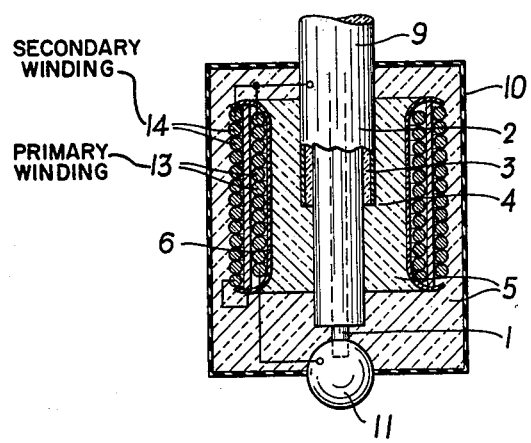
Figure 6:
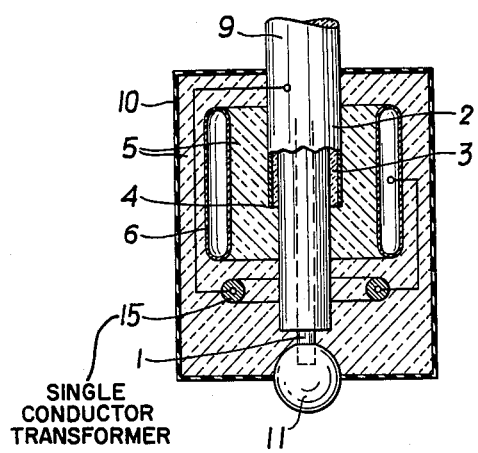

Alternative ways of obtaining the correct auxiliary voltage are shown in FIGS. 4, 5 and 6. As in the embodiment illustrated in FIG. 3, in all the three embodiments a coaxial high-tension cable 9, whose core forms one electrode 1 and metal jacket the other electrode 2, is enclosed at its end in a vessel 10 of insulating material into which the auxiliary electrode 6 is secured by means of a dielectric 5. The dielectric 3 between the electrodes 1 and 2 consists of the synthetic insulation of the cable. There is further provided a ball electrode 11 at the end of the cable core.

According to FIG. 4 the auxiliary electrode 6 is supplied by its own transformer 12 or potential transformer. The primary winding 13 of the transformer 12 is connected between the two electrodes 1 and 2 of the high-tension cable 9 and its secondary winding 14 is applied to the electrode 2 and connected to the auxiliary electrode 6, so that this receives the correct auxiliary voltage. The arrangement in FIG. 5 is similar. Here, however, no special transformer is provided, and instead of it the windings 13 and 14 of the transformer are arranged directly upon the auxiliary electrode 6 and embedded together with it inside the vessel 10 in the dielectric 5. Once again the primary winding 13 is connected across the electrodes 1 and 2, whereas the auxiliary electrode 6 is applied to the secondary winding 14. This ensures that, e.g. in the case of a periodically alternating voltage, the auxiliary voltage generated in the secondary winding 14 is approximately in counter-phase to the voltage between the electrodes 1 and 2 of the cable 9. The transformer may advantageously be so devised that its iron core is saturated already at low cable currents, in order to prevent high cable currents influencing the height of the secondary voltages. In three-phase networks an auxiliary voltage in counter-phase can be obtained by means of a known balancing circuit.

In the example of embodiment shown in FIG. 6 the auxiliary voltage is derived from the cable current. A single-conductor transformer 15 is provided with a jacket or annular core, which carries the secondary winding and is disposed concentrically about the current-carrying electrode 1 of the cable 9. The secondary winding of the single-conductor transformer 15 is connected between the metal jacket of the cable 9 which forms the electrode 2 and the auxiliary electrode 6, as will be seen from FIG. 6. The secondary winding and the iron core of the single conductor transformer 15 may advantageously be so contrived that the requisite auxiliary voltage will be present on the auxiliary electrode 6 at low cable current intensities, on the one hand, yet over-compensation of the field in the edge zone 4 of the electrode 2, which is responsible for glow discharges, is prevented by the saturation of the iron core, on the other.

I claim:

1. In combination, a high-tension electric appliance having at least two spaced main electrodes with a dielectric material disposed therebetween, and means on said appliance for preventing glow discharges on said main electrodes, said means comprising at least one auxiliary electrode extending parallel to said main electrodes and located in spaced relationship therefrom, and means for producing an auxiliary voltage having a potential opposite to the potential of the voltage of one of said main electrodes and applied to the auxiliary electrode.

2. The combination according to claim 1, wherein said auxiliary voltage has the same frequency and substantially opposite phase as the alternating voltage applied to said most distant main electrode.

3. The combination according to claim 2, wherein said main electrodes are the conductors of a coaxial cable having a core forming one main electrode and an outer conductive jacket forming a second main electrode, said auxiliary electrode concentrically surrounding the jacket at the end of the cable to form a cap for the end of the cable.

4. The combination according to claim 3, wherein the auxiliary electrode is mounted together with the main electrodes in an insulating vessel, the vessel being filled with a dielectric.

5. The combination according to claim 4, wherein the auxiliary electrode consists of a layer of sprayed conductive material applied to a solid dielectric.

6. The combination according to claim 5, further comprising a transformer having a primary and a secondary winding and wherein the auxiliary electrode is connected to the secondary winding, the primary winding is connected between the two main electrodes and the secondary winding is connected between the auxiliary electrode and one of the main electrodes.

7. The combination according to claim 6, wherein the auxiliary electrode concentrically surrounds the main electrodes and carries the primary and secondary windings of the transformer.

8. The combination according to claim 6, wherein said transformer is a single conductor transformer having an annular core and the auxiliary electrode is applied to the secondary winding of said single-conductor transformer, said annular core with the secondary winding surrounding said main electrodes.

* * * * *